United States Patent Office 3,067,052
Patented Dec. 4, 1962

3,067,052
GOLD COLORED METALLIC PIGMENTS
Rudolf G. Frieser, Neshanic Station, N.J., and Paul A. Scardaville, Queens Village, N.Y., assignors to Interchemical Corporation, New York, N.Y., a corporation of Ohio
No Drawing. Filed Sept. 21, 1959, Ser. No. 841,048
14 Claims. (Cl. 106—290)

This invention relates to the preparation of gold-colored metallic pigments. More particularly, it relates to aluminum powders which have been treated to produce a gold-colored film on the surface of the particles while retaining the characteristic metallic luster of the aluminum powder.

It has already been proposed to produce colored aluminum powders by applying organic dyestuffs to oxide-coated aluminum powders. It has also been proposed to produce colored aluminum by a multi-stage process whereby the aluminum is first treated to produce a coating thereon of aluminum oxide, then the so coated material is soaked in a solution containing an oxidizable metal ion, and finally the oxide-coated aluminum with the oxidizable metal ion absorbed on and in the oxide coating is treated to oxidize the oxidizable metal ion. Also, several processes have been proposed for the treatment of aluminum to produce dark, electrically non-conductive and corrosion-resistant surfaces.

None of these prior art methods, however, has been satisfactory for the production of gold pigments suitable for decorative inks and enamels. When organic dyestuffs are employed, the products may be made with excellent initial color, but lack lightfastness, and may bleed when applied in an ink. Other chemical coatings on aluminum powders have been dark and lacking in the desired metallic luster. To some extent copper-containing alloys of aluminum have been used when a gold-colored metallic pigment has been required, but these powders besides lacking the desired rich luster and color of gold are also subject to tarnishing so that inks made therefrom lack color stability both in storage and after application.

Accordingly it is an object of this invention to provide an aluminum pigment which is lightfast, of good storage stability, and inert to the common ink and lacquer ingredients. Another object is to provide a method of preparing such a pigment, which method is simple and economical to carry out. Other objects will become apparent from the detailed description which follows.

The novel pigments of this invention may be prepared by agitating aluminum powder with a 0.1 to 0.4 molar aqueous solution of an alkali metal permanganate, which treatment produces a coating on the particles of aluminum such as to give the powder a rich golden appearance. Preferably the solution is acidulated to give an initial pH of about 3. Certain other additives and modifiers are preferably added to the solution in order to control its reactivity and to improve the light stability of the finished pigment. The redder golds may be more conveniently formed by adding small amounts of oxidizable substances, such as formaldehyde, acetaldehyde, methanol, ethanol, alkanolamines, n-propanol, isopropanol, ethylene glycol, and other substances. These substances, hereinafter are referred to as reductants.

The process is applicable to commercial dry aluminum powders of the leafing as well as the non-leafing type, having mesh sizes coarser than 425. Aluminum powders of mesh finer than about 400 have provided difficult to treat by the process of the present invention. Powder of 325 mesh has been found very suitable, as have coarser powders also. It has even been found that large pieces of aluminum, such as sheets, rods, cast shapes, etc., can also be treated to provide a gold-colored coating by use of our process.

Best results have been obtained when using potassium permanganate solutions of about 6% concentration. More dilute solutions have been successfully used, down to about 0.1 molar permanganate concentration, but for the deeper colors the higher concentrations should be used. Other alkali metal permanganates are suitable, but we prefer potassium permanganate for economy and convenience. The process of the present invention is operative over a temperature range from 5° C. to 100° C., depending on the time of reaction and the particular composition of the solution used. Processing time in the coloring bath usually varies from half an hour to six hours.

The gold color is visible in 1 minute.

Weight ratios of treating solution to aluminum between 10 and 30 are preferred. When the ratio is less than 10 the time of treatment becomes too long for convenience and proper agitation may be more difficult. With ratios higher than 30 the time of treatment becomes so short that stopping the color development at the stage desired is impractical.

A gold powder having a metallic luster can be obtained in the absence of a reductant but in the presence of a reductant the process yields darker, deeper shades. Particularly suitable reductants are lower aliphatic alcohols including glycols, lower aliphatic aldehydes, and alkanolamines although various other reducing substances may be used. To some degree the reductant chosen will affect the color obtained, for example methanol and the ethanolamines produce reddish gold tones whereas formaldehyde, ethanol, and propanol favor the formation of greenish-yellow tones.

Air drying and oven drying up to 100° C. give identical products, but the latter is preferable because better control is possible. Heating the pigment at temperatures between 100 and 200 degrees C. intensifies the color but reduces the lightfastness.

To improve the dispersing properties of the finished product, the best results are obtained by giving the pigment a final wash with stearic acid in methanol before drying, or by hand milling the dry powder with stearic acid. Also passing the dry pigment through a 325-mesh screen imparts very satisfactory dispersing properties to the dry pigment.

The acid used in my preferred procedures should be of such strength and concentration that the pH of the solution will remain substantially within the limits of 2 and 9.5 during the course of the process.

To throw some light on the chemistry of our process, a brief review of some pertinent information from the literature inserted here may be useful.

Aluminum, and in particular aluminum powder, has a strong tendency to decompose water, with evolution of hydrogen, and in solutions which do not form complexes with aluminum ions, the metal tends to acquire a protective oxide film. The exact nature of this oxide is not known, although it is believed the inner portion near the metal is oxide, while the outer portion is hydrated oxide or can be hydrated by sufficient contact with aqueous solutions. In a solution free of substances which are able to form soluble complexes or insoluble salts, corrosion takes place below a pH of 4 and above a pH of 8.6. In actual practice the corrosion behavior of aluminum is determined by the behavior of the film of oxide, with which it is always covered, towards the solutions in contact with it. In general, the film of oxide dissolves slower in acidic solutions than in alkaline ones, but it is not soluble in ammonia. Water alone usually does not attack it.

An oxide coating may be deposited on aluminum by immersing the metal in a solution where it will be attacked to a limited extent by one ingredient and simultaneously oxidized by another. Such a solution is used, for example in the "Alrok" treatment where aluminum is immersed in a hot solution of sodium carbonate and sodium dichromate. The film formation depends upon a definite balance between the action of the two components. The rate of growth of the film depends to a large extent upon the rate of diffusion through it.

Hydrogen gas reduces solutions of alkali metal permanganates, especially when warmed. It has been found that a well stirred solution of, for example, 5% potassium permanganate absorbs hydrogen gas at a steady rate. In acidic solutions hydrogen precipitates finely-divided $MnO_2$ and oxygen is evolved. In approximately neutral solutions the reaction produces colloidal manganese dioxide. No oxygen is evolved but KOH is formed so that the reaction medium quickly becomes alkaline unless the KOH can be disposed of. In alkaline solution reduction by hydrogen is slow, $K_2MnO_4$ and $MnO_2$ are first formed. Later $K_2MnO_4$ breaks down to $MnO_2$ and KOH.

The oxidizing action of alkali metal permanganates is most energetic in acidic solutions, two molecules of permanganate yielding five atoms of oxygen, whereas in alkaline solutions only one atom of oxygen would be released. Neutral solutions produce three atoms of oxygen from two molecules of alkali metal permanganate but, since alkali metal hydroxide is a byproduct of this action, this solution would quickly become alkaline unless the alkali was neutralized or removed.

The oxides of manganese produced from permanganates by the action of gaseous reducing agents are more finely divided and are capable of reacting more rapidly than those produced by a solid or liquid reductant.

In acidic solutions there is an initial incubation period before permanganate solutions yield their full power of oxidation, but this delay may be considerably shortened when a reducing agent is present.

With these and other considerations in mind, we believe our process operates by gradually co-depositing finely divided, perhaps colloidal, oxides of manganese and the type of aluminum oxide that is adherent, transparent, and tough onto the bright surfaces of the aluminum metal in such a way that the metallic luster is still plainly evident and the pigment as finally processed has acquired a color ranging from greenish yellow through golden yellow, reddish gold, and somewhat browner or grayer hues, the color depending upon the conditions chosen. The manganese dioxide produced outside this coating sometimes aids in giving the effect of a deep shade. Action begins when the surfactant has removed the coating of oil or other similar material from the aluminum metal. In acidic processing baths the initial pH is preferably about 3. As the reaction proceeds potassium acetate is formed, quickly raising the pH to the range of about 4–6, where it remains in those examples of our process that operate entirely on the acid side, like Example No. 1. Such pigments acquire considerably more lightfastness when after-treated with a dilute alkali such as sodium or potassium hydroxides or carbonates. Ammonium hydroxide will not do. When the processing bath reaches a plateau in the mildly alkaline region, pH 7.1–9.5 as in Examples 2 and 8, after-treatment with alkali is not necessary for improving the lightfastness. Methanol is oxidized mainly to carbon dioxide at low pH values but increasingly to formic acid in the neighborhood of pH 6–7 and on the alkaline side. The pH of the methanol treated baths levels off after awhile around pH 8–9. This is approximately the pH value of potassium acetate and formate solutions. The rise in pH is facilitated by the oxidation of methanol or other easily oxidizable compounds that we prefer to add, because of the formation of additional potassium acetate, potassium formate or similar salts, as well as by the depletion of the acid originally present. When the solution is more or less neutral the manganese acetate or similar manganese salt, formed well on the acid side of neutrality, reacts with potassium permanganate to produce manganese oxides and potassium acetate or similar potassium salt.

For the operation of our invention in strongly alkaline solutions, the alkali should be one that does not attack the oxide film on the aluminum, ammonium hydroxide being the alkali we prefer. Hydrogen gas is vigorously evolved at the start of the process and gradually reduces some $KMnO_4$ to $K_2MnO_4$ and oxides of manganese. After a while $K_2MnO_4$ breaks down to $MnO_2$ and KOH. Through the reaction $2Al+6NH_4OH=2Al(OH)_3+H_2+2NH_3$ ammonia is gradually lost from the solution by evolution as a gas mixed with hydrogen. The pH then decreases from its initial value of about 11. At the point where appreciable amounts of KOH are generated by the breakdown of $K_2MnO_4$ the treatment apparently must be stopped because KOH would tend to attack the oxide coating on the aluminum, especially if the ammonium radical in solution is much depleted. The coatings produced by this highly alkaline bath process are, however, not quite as desirable as those produced by my other solutions.

The following examples are given as illustrations but not as limitations:

*Example 1*

300 grams of 325-mesh aluminum powder are gradually added to a solution, at room temperature, of 379.2 grams potassium permanganate, 72 grams glacial acetic acid, and 120 milliliters of a 3.5% solution in water of sodium lauryl sulfate dissolved in 6 liters of water. When the aluminum powder has been added and wetted, 36 milliliters of methyl alcohol are added dropwise. The solution is stirred vigorously throughout the process. The temperature rises about 10°. 45 minutes after all the alcohol has been added the slurry is filtered, the pigment is washed with water, then washed with acetone, and oven dried at 60° C. for one hour. 250 grams of this product is slurried in 7.5 liters of 0.025% sodium hydroxide solution for 15 minutes, filtered, washed free of alkali with water, washed with acetone, and oven dried at 60° C. for one hour. Its dispersing properties can be improved by screening through a 325-mesh screen.

*Example 2*

100 grams of 325-mesh aluminum powder are gradually added to a solution, at about room temperature, of 95 grams potassium permanganate, 12 grams glacial acetic acid, and 20 milliliters of a 3.5% solution of sodium lauryl sulfate in 1500 milliliters water. When all the aluminum powder is wet, 24 milliliters of methanol are added dropwise. The solution is stirred vigorously for 5 or 6 hours, if a dark reddish gold is wanted. The temperature should be kept under 40° C. If a lighter, yellow gold is desired, the reaction should be stopped after about 2 to 4 hours. When the reaction has produced the color wanted, the slurry is filtered, the pigment washed free of permanganate with water, washed with acetone, and oven dried at 60° C.

*Example 3*

Add, with constant stirring, 100 grams of 325-mesh aluminum powder to a solution at room temperature of 126.4 grams potassium permanganate, 24 grams glacial acetic acid, and 40 milliliters of a 3.5% solution of sodium lauryl sulfate in 2000 milliliters of water. When all the aluminum powder is wetted, 6 milliliters of ethylene glycol is added dropwise and the solution stirred 45 minutes. The slurry is washed free of permanganate with water, washed with acetone, and oven dried at 60° C. for one hour. 134 grams of the resulting pigment is slurried 15 minutes in 4 liters of a 0.025% sodium hydroxide solution, filtered, washed free of alkali with water, washed with acetone, and oven dried at 60° C. for one hour.

*Example 4*

100 grams of 325-mesh aluminum powder is added with constant stirring to a solution at room temperature of 126.4 grams potassium permanganate, 24 grams glacial acetic acid, and 40 milliliters of a 3.5% sodium lauryl sulfate solution in 2000 milliliters of water. When all the powder has been wetted, add 12 milliliters of a 4/1 solution of triethanolamine titanate and isopropanol. Stirring is continued for one hour. The slurry is then filtered, washed with water, washed with acetone, and oven dried at 60° C. 130 grams of the resulting pigment are slurried 5 minutes in 4 liters of 0.025% sodium hydroxide solution, washed free of alkali, washed with acetone, and oven dried at 60° C. Improved dispersing qualities can be imparted to the pigment at this state by shaking 30 grams in a "quickie mill" with a mixture of 0.9 gram stearic acid, 0.3 gram sodium lauryl sulfate, 0.02 gram sodium hexamethaphosphate, and 25 milliliter of water. The shaking is done in 3 periods of 5 minutes each spaced by cooling periods of 25 minutes. It is finally oven dried at 60° C.

*Example 5*

50 grams of 325-mesh aluminum powder is added with constant stirring to a solution at room temperature of 63.2 grams potassium permanganate, 12 grams glacial acetic acid, and 20 milliliters of a 3.5% solution of sodium lauryl sulfate in 1 liter of water. Stirring is continued for 1 or 2 hours to give a red gold pigment. Darker shades may be obtained by continuing the process 4 to 5 hours. When the desired result is obtained, the slurry is filtered, washed with water, then with acetone, and oven dried at 60° C. For runs of two hours and less the lightfastness can be further increased by the after treatment with dilute caustic solution as in Examples 1, 3, and 4.

*Example 6*

150 grams of 325-mesh aluminum powder is added with constant stirring to a solution at room temperature of 189.6 grams potassium permanganate, 45 milliliters of concentrated ammonium hydroxide, and 30 milliliters of a 3.5% solution of sodium lauryl sulfate in 3 liters of water. Stirring is continued 45 minutes, the temperature being kept below 40° C. The slurry is filtered, washed with water, then washed with acetone, and oven dried at 60° C.

It is to be understood that my invention is not limited to the specific details herein described since these can be varied without departure from the spirit of the invention.

*Example 7*

Ingredients:
  50 gms. 100-mesh, leafing aluminum powder
  63.2 gms. KMnO$_4$ in 1 liter distilled water
  50 mls. 3.5% sodium lauryl sulfate solution
  11.5 mls. glacial acetic acid
  6 mls. methanol The procedure of Example 1 is followed.

*Example 8*

110 gms. KMnO$_4$ are dissolved in 1.75 liters of water and cooled to 25° C. To this are added 20 mls. of 3.5% of sodium lauryl sulfate and 18 mls. of glacial acetic acid. 100 gms. of 325-mesh aluminum powder are now added with vigorous stirring. After all the powder is in, the temperature is lowered to 25° C. and 18 mls. of methanol added dropwise. Vigorous stirring is maintained for 6 hours. The temperature should rise to 35° C., but no higher, for one half to three quarters of an hour after the methanol has all been added. Cool if necessary. The pigment is washed and dried as in Example 1, but is not after-treated with alkali. The processing bath has a pH of about 8.0–8.8 during the last half of the treatment. The lightfastness is better than 500 hours.

We claim:

1. A pigment ranging in color from greenish yellow to dark reddish gold consisting of pigment-sized particles of metallic aluminum coated with a transparent film of co-deposited oxides of manganese and aluminum.

2. A pigment ranging in color from greenish gold through yellow gold to dark reddish gold consisting of pigment-sized particles of metallic aluminum coated with an adherent film of co-deposited oxides of manganese and aluminum, which film is sufficiently transparent to permit the metallic luster of the aluminum to be visible.

3. The pigment of claim 2 in combination with that oxide of manganese produced in the process which is not in the film of co-deposited oxides on the aluminum, the combination having a metallic luster.

4. The pigment of claim 3 having a lightfastness of 100 to 600 hours under standard Fadeometer conditions.

5. The pigment of claim 3 having a mesh size of 100 to 400.

6. A process of producing a gold-colored aluminum pigment which comprises slurrying aluminum powder, coarser than 425 mesh, with a 0.1 molar to saturated at about room temperature solution of alkali metal permanganate, agitating the resulting mixture at a temperature between 5° and 100° C. for a period of time sufficient to develop a gold-colored surface coating on the metallic particles, and separating the resulting pigment from the treating solution.

7. A method of producing a gold-colored metallic pigment which comprises (1) stirring aluminum powder, coarser than 425 mesh, in an aqueous solution containing about 6% potassium permanganate and between 0.1% and 3% acetic acid at a temperature between 5° and 100° C. for a period of time between 1 minute and 8 hours (2) separating the thus treated aluminum pigment from the aqueous solution and drying it promptly (3) contacting said aluminum pigment with a 0.1% to 0.005% solution of sodium hydroxide (4) washing said aluminum powder with water until substantially free of alkali, and (5) drying the resulting pigment.

8. A method of producing a gold-colored metallic pigment which comprises (1) stirring aluminum powder, coarser than 425 mesh, in an aqueous solution containing about 6% potassium permanganate and between 0.1% and 3% acetic acid at a temperature between 5° and 100° C. in the presence of an organic substance which is substantially oxidized by the solution (2) stirring the solution for a period of time between 1 minute and 8 hours (3) separating the thus treated aluminum from the aqueous solution and drying it promptly (4) contacting said aluminum pigment with a 0.1% to 0.005% solution of sodium hydroxide (5) washing said aluminum powder with water until substantially free of alkali, and (6) drying the resulting pigment.

9. A method of producing a gold-colored metallic pigment which comprises (1) stirring aluminum powder, coarser than 425 mesh, in an aqueous solution containing about 6% of an alkali metal permanganate, a wetting agent, and between 0.1% and 3% acetic acid at a temperature between 5° and 100° C. (2) adding an organic substance which is substantially oxidized by the solution and which is selected from the group consisting of lower aliphatic alcohols, glycols, lower aliphatic aldehydes, and alkanolamines, stirring the solution for a period of time between 1 minute and 8 hours (3) separating the thus treated aluminum pigment from the aqueous solution, washing it substantially free of permanganate promptly, and (4) drying the resulting pigment.

10. The method of claim 9 wherein the substance of step (2) is a lower aliphatic alcohol.

11. The method of claim 9 wherein the substance of step (2) is a lower aliphatic aldehyde.

12. The method of claim 9 wherein the substance of step (2) is a glycol.

13. The method of claim 9 wherein the substance of step (2) is an alkanolamine.

14. A method of producing a gold-colored metallic pigment which comprises (1) stirring aluminum powder, coarser than 425 mesh, in an aqueous solution containing about 6% potassium permanganate, a wetting agent, and 0.1 molar to 0.5 molar ammonium hydroxide at a temperature between 5° and 50° C. for a period of time between 1 minute and 2 hours (2) separating the thus treated pigment from the aqueous solution promptly and washing it substantially free of alkali, and (3) drying the resulting pigment.

References Cited in the file of this patent

UNITED STATES PATENTS

| | | |
|---|---|---|
| 1,965,269 | Tosterud | July 3, 1934 |
| 2,019,229 | Leahy | Oct. 29, 1935 |
| 2,071,156 | Baer | Feb. 16, 1937 |
| 2,247,580 | Jauch | July 1, 1941 |
| 2,512,493 | Gide | June 20, 1950 |
| 2,681,873 | Denniston | June 22, 1954 |
| 2,785,098 | Cunningham et al. | Mar. 12, 1957 |
| 2,976,193 | Pimbley | Mar. 21, 1961 |